Aug. 28, 1951     F. M. GUY     2,565,606
UNIVERSAL JOINT
Filed Oct. 9, 1946     4 Sheets-Sheet 1
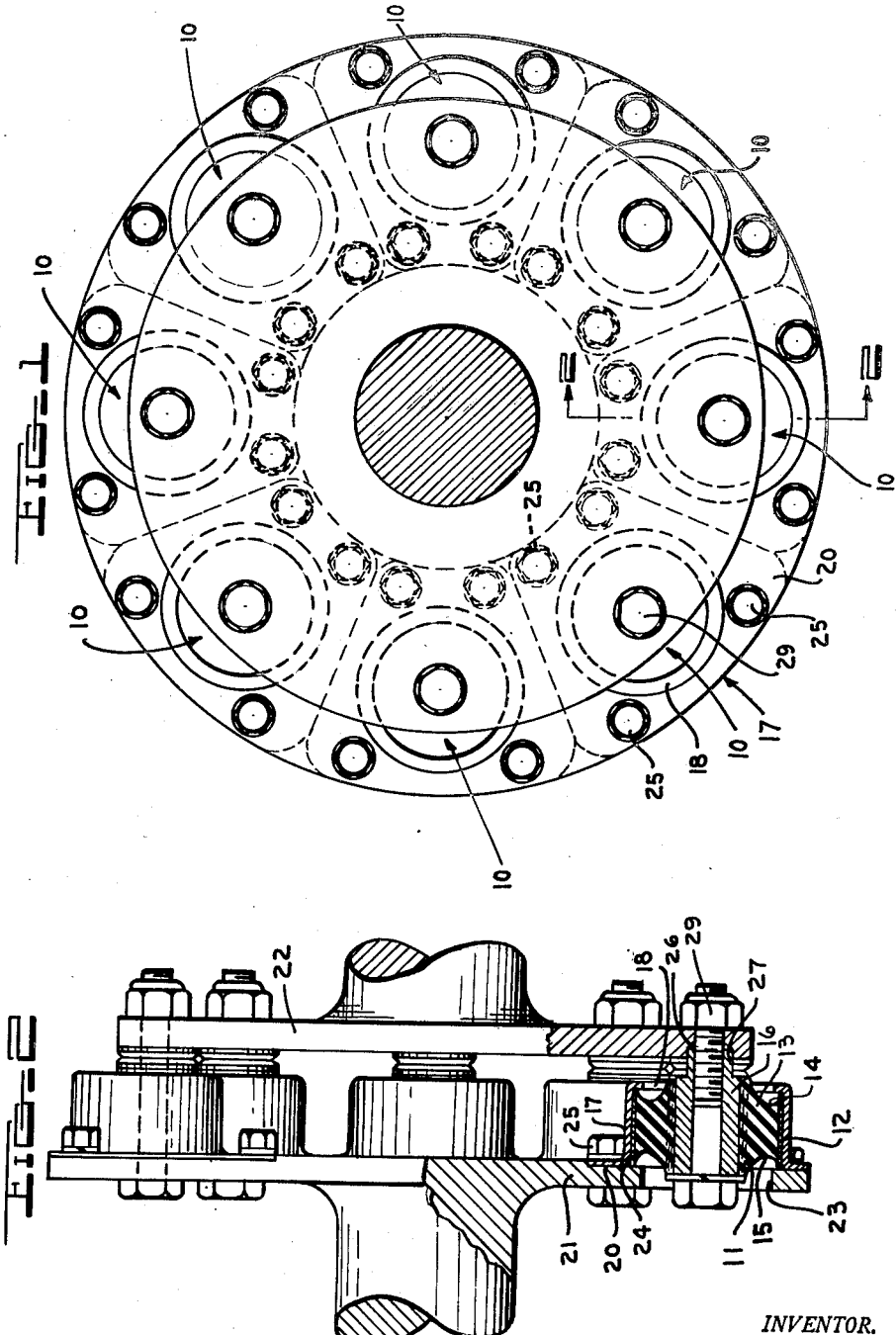
INVENTOR.
FREDERICK M. GUY
BY
*Arthur M. Smith*
ATTORNEY Aug. 28, 1951     F. M. GUY     2,565,606
UNIVERSAL JOINT
Filed Oct. 9, 1946     4 Sheets-Sheet 2
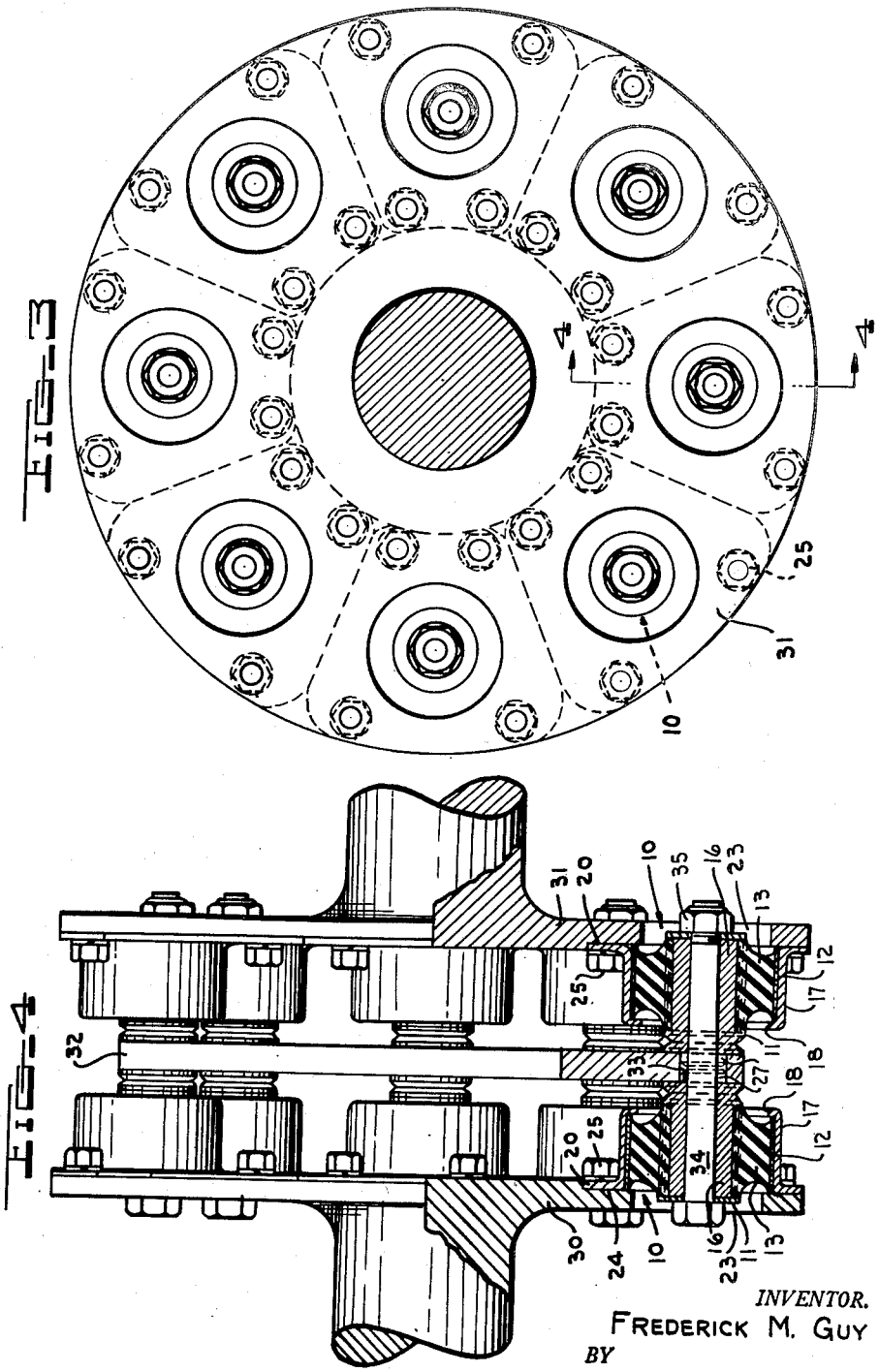
INVENTOR.
FREDERICK M. GUY
BY
ATTORNEY Aug. 28, 1951  F. M. GUY  2,565,606
UNIVERSAL JOINT
Filed Oct. 9, 1946  4 Sheets-Sheet 3
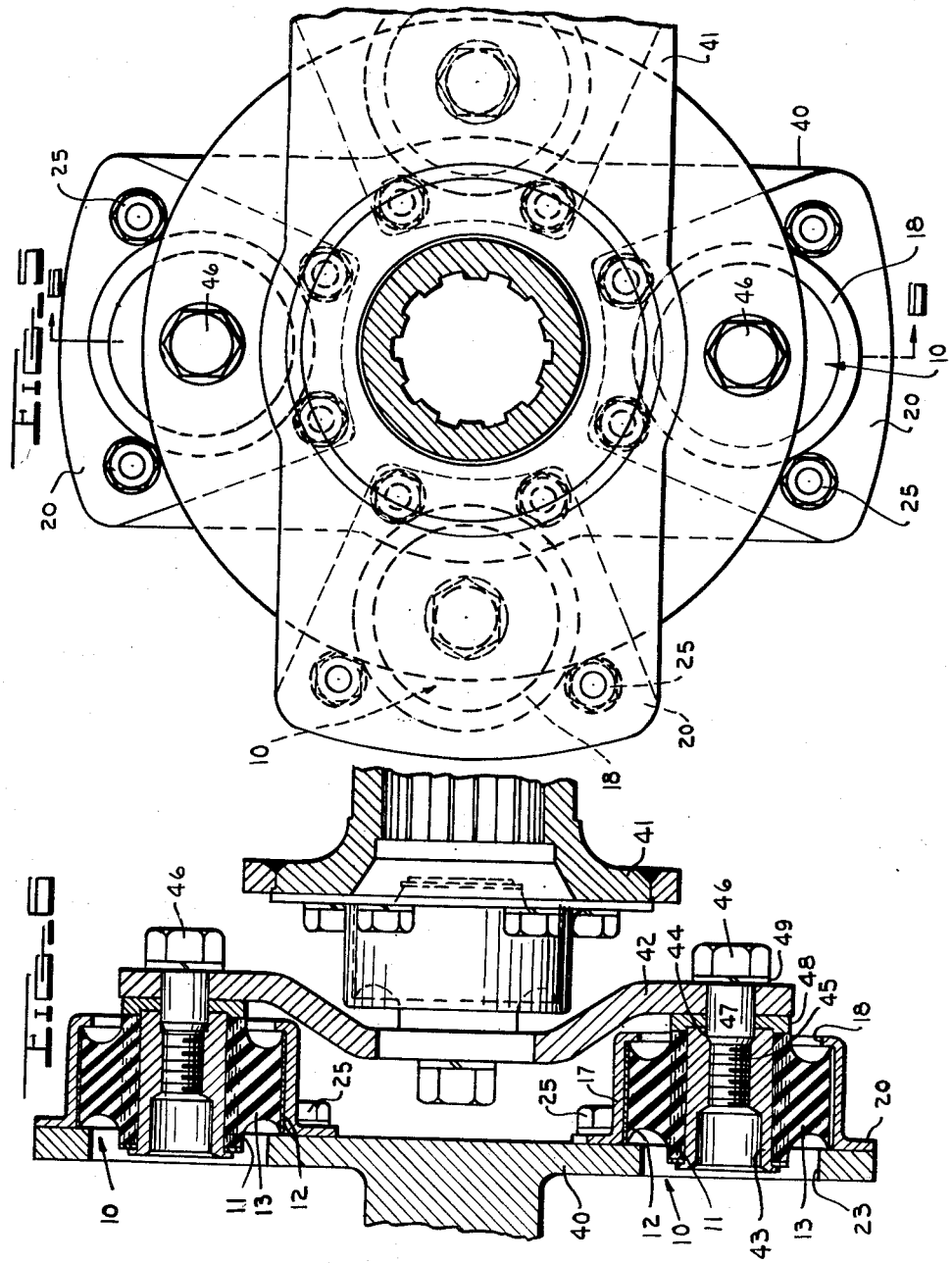
INVENTOR.
FREDERICK M. GUY
BY
Arthur M. Smith
ATTORNEY

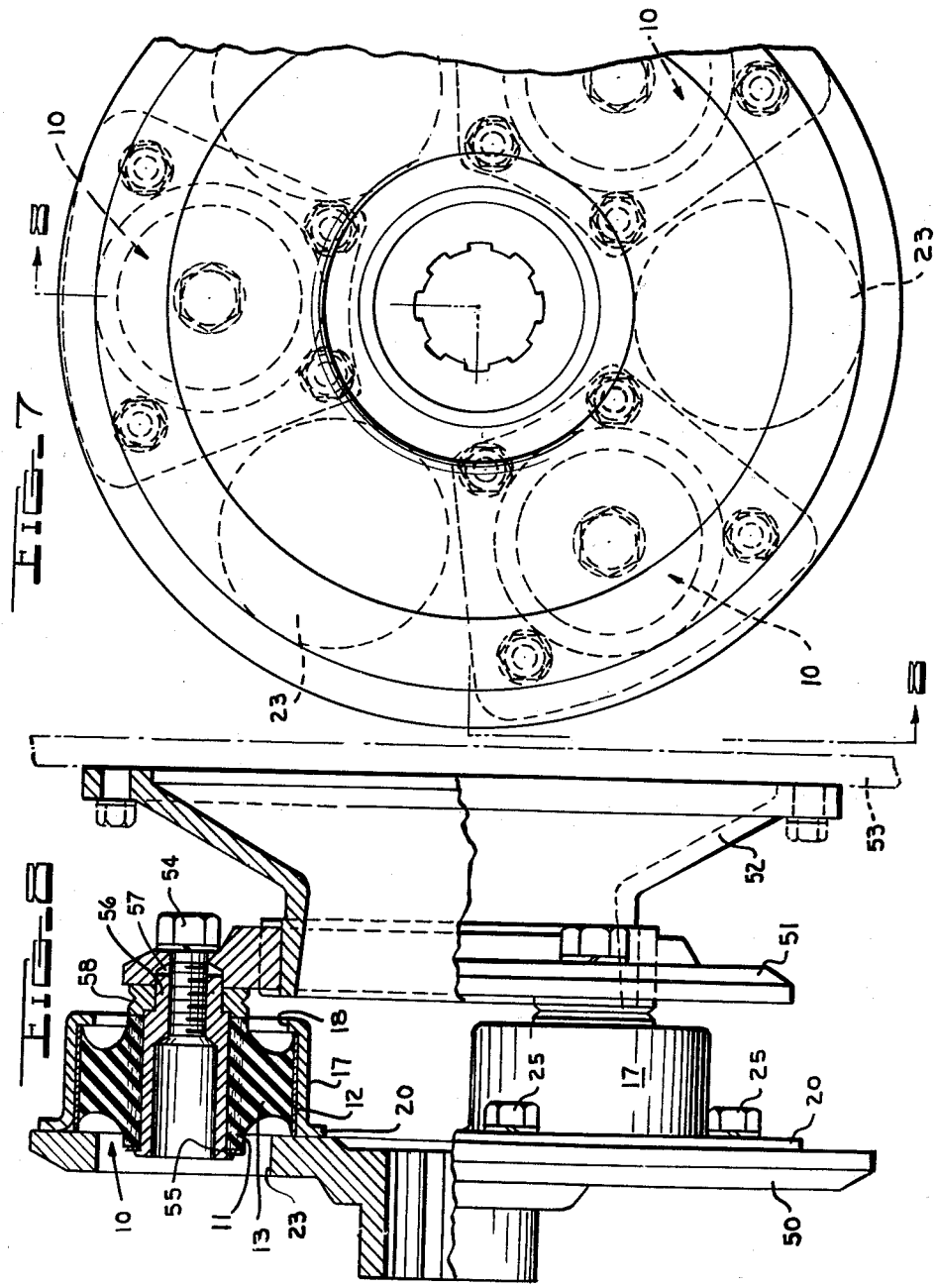

Patented Aug. 28, 1951

2,565,606

UNITED STATES PATENT OFFICE 2,565,606

UNIVERSAL JOINT

Frederick M. Guy, Detroit, Mich., assignor to Guy & Murton, Inc., Detroit, Mich., a corporation of Michigan Application October 9, 1946, Serial No. 702,244

8 Claims. (Cl. 64—11)

The present invention relates to a universal joint or flexible coupling and more particularly to such joint or coupling in which resilient elements are interposed between the driving and driven shaft to provide a flexible driving connection.

The present invention is an improvement upon the universal joint construction shown in my issued Patents Nos. 1,978,939, dated October 30, 1934, and 2,195,647, dated April 2, 1940.

An object of the present invention is to provide an improved universal joint or flexible coupling in which resilient bushings are interposed between the driving and driven shaft connection to provide for the parallel, angular and longitudinal misalignments of the connected shafts and to provide a yielding but positive connection between the shafts whereby irregularities in the transmitted torque loads are cushioned to provide a smooth flow of power through the joint or coupling with a minimum amount of power loss.

It is a further object of the present invention to provide an improved universal joint or flexible coupling in which all metal to metal contacts between the driving and driven shaft connections are eliminated, thus providing a joint or coupling which is quiet in its operation, is not affected by dirt or grit and which does not require lubrication.

It is a further object of the present invention to provide an improved universal joint or flexible coupling in which all parts are centralized in a unitary carrier to provide a joint or coupling of balanced construction which runs true without friction or backlash during its operation, the design of the carrier and the resilient drive member mounted therein permitting the economical manufacture of the joint or coupling by mass production methods within rather broad tolerance limits.

It is a further object of the present invention to provide an improved universal joint or flexible coupling in which the construction of the carrier permits the ready installation or removal of the joint or coupling between the driving and driven flanges attached respectively to the driving and driven shafts and in which, because of its design and construction, the size and weight of the carrier member is held to a minimum for the load capacity of the joint or coupling.

It is a further object of the present invention to provide a universal joint or flexible coupling of the resilient type particularly adapted for use where a high capacity and heavy duty universal joint or flexible coupling is required and in which the space limitations require a compact design and construction of the unit. The construction provides a separate mounting of each resilient bushing, thus facilitating the manufacture and assembly of the joint or coupling and permitting the separate removal and replacement for servicing of any individual resilient bushing without requiring the complete disassembly of the joint or coupling.

Other objects of this invention will appear in the following description and appended claims, reference being had to the accompanying drawings forming a part of this specification wherein like reference characters designate corresponding parts in the several views.

In the drawings:

Fig. 1 is a plan view of a resilient universal joint or flexible coupling showing one embodiment of the present invention.

Fig. 2 is a side elevation with parts broken away and partially in section showing a universal joint or flexible coupling of the type shown in Fig. 1, the resilient bushing and carrier shown in this view in section taken substantially on the line 2—2 in the direction of the arrows, Fig. 1.

Fig. 3 is a plan view of a modified form of universal joint or flexible coupling and showing a modified type of universal joint or flexible coupling embodying the present invention.

Fig. 4 is a side elevation with parts broken away, partially in section, showing the universal joint or flexible coupling of Fig. 3 with the resilient bushing and carrier being shown in section, taken substantially on the line 4—4 in the direction of the arrows, Fig. 3.

Fig. 5 is a fragmentary plan view showing another modification of the present invention embodied in a universal joint or flexible coupling.

Fig. 6 is a section taken substantially on the line 6—6 looking in the direction of the arrows, Fig. 5.

Fig. 7 is a fragmentary plan view showing another embodiment of the present invention embodied in a resilient universal joint or flexible coupling.

Fig. 8 is a side elevation with a portion shown in section, taken substantially on the line 8—8 in the direction of the arrows, Fig. 7.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Several embodiments of a universal joint or flexible coupling embodying the present invention is shown in the drawings. The common feature of all the construction here shown resides in the mounting of the resilient bushing. The several embodiments here shown differ chiefly in the design and construction of the members connected with the mounted resilient bushings.

In the several views the same numerals are used to indicate all parts which are the same. In all of the views a plurality of resilient bushings is indicated generally by the numeral 10. Each of the plurality of resilient bushings 10 includes a centrally located core 11 and a circumferential shell 12 spaced concentrically with relation to said core, and an annular body 13 of resilient material preferably molded natural or synthetic rubber or a blend thereof. The faces of the annular body 13 are channeled as at 14 and 15 to provide annular groove portions which extend concentric to the core 11 and shell 12.

In each of the resilient bushings 10, a connector stud 16 is secured to the core 11 and provides a means for effecting a positive mechanical connection between a part to be connected and the annular body 13 of resilient material. A flanged open end cup 17 is provided for each of the plurality of resilient bushings 10 and has an annular flange portion 18 which surrounds the open end thereof and bears against the edge of the circumferential shell 12 to retain the bushing 10 in a predetermined location in said cup 17. The connector studs 16 of all the resilient bushings 10 extend through the openings in the ends of the cups 17 to permit a mechanical connection directly with said studs 16 independently of said cups 17.

Each of the cups 17 is essentially cylindrical in shape and is provided with a connector flange 20 extending outwardly from the base thereof to permit a positive connection between said cups 17 and a carrier flange. As here shown, the preferred shape given the connector flanges 20 is that of a truncated radial segment which, as shown in Figs. 1 and 3, permits close spacing of a desired number of the cups 17 about a circular connector plate. While this particular shape is shown also in Figs. 5 and 7, it is apparent that the shape of the flange 20 is not critical when used with the types of connector plates there shown.

In the embodiments shown in Figs. 1 to 4, inclusive, two types of universal joints or flexible couplings are shown which are particularly adapted for heavy duty applications and in which the driving and driven members are spaced endwise within close limits. In such applications, it is essential to provide the maximum number of resilient bushings 10 within the limited available space in order that the load will be distributed over a sufficient amount of the resilient material to assure the cushioned transmission of the torque through the joint or coupling.

The construction shown in Figs. 1 and 2 comprises a flange 21 which may be connected with either the driving or the driven member and a flange 22 which may be connected with the other of the driving or driven members. In the construction here shown, the flange 21 is provided with a plurality of spaced peripheral openings 23 and a recessed flange-receiving portion 24 shaped to receive the flange portions 20 of the pockets 17.

The flange portions 20 of the pockets 17 are secured within the recessed portion 24 of the flange 21 in any suitable manner as, for example, by a plurality of machine bolts 25.

A flange 22 is provided with a plurality of piloting recesses 26, each spaced to receive one of the pilot stud portions 27 of the connector studs 16. A connector bolt 28 extends through each of the openings 23 in the flange 21 and through each of the connector studs 16 in the flange 22. A threaded nut 29 is screw-threaded on each connector bolt 28 and holds the flange 22 in connected relation to the studs 16.

Thus torque transmitted from either flange to the other is transmitted through the resilient bushings 10 which accommodate, by relative movement of the cores 11 and the shells 12, the misalignments to which the flanges 21 and 22 are subjected.

It will be observed also that the radial edges of the flanges 20 of the pockets 17 abut each other and thus provide a compact placement of the resilient bushings about the flange 21.

In those instances in which a higher load is to be transmitted than is recommended for the construction shown in Figs. 1 and 2, I prefer to use the construction shown in Figs. 3 and 4. Referring to these views, the universal joint or resilient coupling comprises flanges 30 and 31 which may be connected as desired, one to the driving and one to the driven member. Each of the flanges 30 and 31 is constructed, as is the flange 21 previously described, to provide a plurality of spaced openings 23 and a recessed flange portion 24 for receiving the flanges 20 of the resilient bushing pockets 17 which are each held on their respective flanges by any suitable fastening means, such, for example, as the machine bolts 25. By this construction, each flange 30 and 31 is provided with a plurality of resilient bushings 10, each of the same construction as has been previously described. The pilot stud portions 27 of the connector studs 16 of the resilient bushings 10 mounted on the flange 30 face the pilot stud portions 27 of the connector studs 16 of the resilient bushings 10 mounted on the flange 31.

An annular center plate 32 is disposed between the flanges 30 and 31 and is provided with a plurality of pilot guide pockets 33 each adapted to receive and locate the opposed pilot stud portions 27 of the connector studs 16 carried by the flanges 30 and 31. A connector bolt 34 extends through the studs 16 of the opposed resilient bushings 10 and the plates 32 and is secured by the nut 35 to connect the studs 16 of each opposed pair of bushings 10 with the center plate 32.

In this construction, it will be seen that torque is transmitted through the two sets of resilient bushings 10 connected with the flanges 30 and 31, the drive being transmitted from the driving flange through the resilient bushings 10 secured to it, and through them to the studs 16 of the resilient bushings 10 secured to the driven flange. The center annular plate 32 acts to hold the studs 16 of each set of bushings 10 in alignment and to distribute the torque over the connected bushings.

Relative movements of the connected members are accommodated by movement of all of the cores 11 relative to all of the shells 12 of all the resilient bushings 10. Since such movement is resiliently opposed by the annular bodies of resilient material 13, it will be seen that a resiliently cushioned flexible torque transmitting connection is provided between the driving and driven members.

Since the number of resilient bushings 10 of any given size is a determining factor in fixing the capacity of the universal joint or coupling of the present invention, a lesser number of such bushings 10 of the same size may be employed to provide a universal joint or coupling for lighter duty installations. Typical of such constructions are those shown in Figs. 5 to 8, inclusive.

In the constructions shown in Figs. 5 and 6, four of the resilient bushings 10 are provided. Each has the construction previously described and each is held in an open end pocket 17 having the annular flange 18 previously described. In this construction, two of the pockets 17 are secured to a driving flange 40 and two of the pockets 17 are secured to a driven flange 41. The driving and driven flanges 40 and 41 are normally arranged with their longitudinal axes disposed substantially at right angles to each other as shown in Fig. 5.

The open ends of the pockets 17 on the driving member 40 open toward the open ends of the pockets 17 on the driven member 41. A dished rigid central member 42 is interposed between the opposed faces of the driving flanges 40 and the driven flange 41 and is connected with the core portions 11 of the resilient bushings 10 carried by both the driving and driven flanges 40 and 41.

A hollow connector stud 43 is secured in each of the core portions 11 of each of the resilient bushings 10 and is provided with a female pilot guide portion 44 and a screw-threaded recess 45.

The dished rigid central member 42 is connected with the studs 43 by a plurality of connector bolts 46 each of which has a male pilot guide 47 which fits in the female pilot guide portions 44 in the connector studs 43, and a screw-threaded end which engages with the screw-threaded recess portion 45.

An annular spacer 48 is disposed over the end of the hollow connector stud and between it and the adjacent face of the center member 42. A lock washer 49 is provided for each connector bolt 46 to hold it in its tightened position in the assembly.

In this construction, it will be seen that torque is transmitted from the driving to the driven member through the cores 11 of all the plurality of resilient bushings 10 in the assembly. The resilient bushings 10 and the joint or coupling are held in alignment by the connections between the studs 43 and the rigid member 42 which also acts to distribute the load over all of the resilient bushings 10. Here, as in the previously described constructions, relative movement of the driving and driven members is accommodated by the displacement of all the core portions 11 relative to all the shell portions 12 of all the resilient bushings 10. This displacement is accommodated by displacement of the annular bodies of resilient material 13 and hence all movements of the driving and driven members are resiliently cushioned by the construction here disclosed.

A futher modified form of universal joint or coupling particularly adapted for lighter duty installations is shown in Figs. 7 and 8 and comprises a driven flange 50 and a driving flange 51. In the construction here shown three of the resilient bushings 10 are employed. These are all mounted on the driven flange 50. Each of the bushings 10 is of the same construction previously described and each is mounted in an open-ended pocket 17 which also has been previously described.

A driving flange 51 as here shown is mounted on a mounting bracket 52 which connects with the driving member shown 3 in dotted line and indicated by the numeral 53. The driving flange 51 is connected by the cores 11 of all of the resilient bushings 10 by a plurality of screw-threaded studs 54, one of which engages with each of the hollow connector studs 55, secured to each of the cores 11.

A male pilot end portion 56 is formed on the end of each connector stud 55 and seats in the female locating recess 57 provided in the driving flange 51. An annular spacer 58 extends over the male pilot end portion 56 and the adjacent end surface of the connector stud 55 and spaces the said stud 55 relative to the driving flange 51 and also provides an additional bearing surface at the point of contact between the driving flange 51 and the connector stud 55.

In the construction here shown, six of the openings 23 are provided in the driven flange 50 to permit the location of the resilient bushings 10 in various positions thereon as may be required by the particular conditions of installation. While three of the bushings 10 are here shown, it is to be understood that any other desired number may be employed and may be arranged symmetrically about the driven flange 50.

In this construction, the torque load is transmitted from the driving member 51 to the driven member 50 through all of the plurality of resilient bushings 10 which are mounted on the driven flange 50. Misalignments of the driving and driven members are accommodated by relative movement between the cores 11 and the shells 12 of all of the resilient bushings and this movement is resiliently cushioned by the body of resilient material 13 interposed between said cores and shells. Due to the particular construction here shown, the load is distributed over all of the resilient bushings 10 and hence all displacements of the driving and driven members likewise are accommodated by movement occurring in all of the resilient bushings.

In all of the constructions shown in the drawings herein it is to be observed that both the torque load and the relative misalignments of the shafts or other connected members is accommodated by movement which occurs simultaneously in all of the resilient bushings 10. Thus localized loading of the bushings or localized strains in the joint or couplings are eliminated and hence the useful service life of the bushings is increased over constructions in which the loading condition may be localized on a few of the resilient bushings. It is characteristic of resilient bushings of the type herein utilized that the greatest load will be localized in the weakest bushing. The constructions herein disclosed assure the distribution of the loads over all of the resilient bushings and hence by this mechanical distribution of the loads overloading of any particular bushing or group of bushings is prevented.

It is also to be understood that any desired number of resilient bushings 10 may be provided in any of the constructions herein disclosed, the number being determined by the size and strength properties of the bushings and the loads to be carried by the universal joint or flexible coupling. The particular arrangement of the bushings relative to the driving and driven members is determined to a large extent by the space limitations of the location in which the joint or coupling is to be employed.

The mounting of each resilient bushing 10 in a separate detachable pocket makes the design particularly adaptable to a large variety of uses in that it permits a ready installation and removal of each bushing in the joint or coupling assemblies. Likewise after a joint or coupling embodying the present invention has been in service, the individual blocks may be removed and replaced as may be required by the service conditions of the joint or coupling without disturbing others of the blocks in the assembly. This is particularly desirable where a universal joint or coupling of the present invention is installed for heavy duty work in a fixed installation, and in which the centers between the driving and driven members have been carefully prelocated and may not be readily changed. This is particularly the case in connection with the use of such units in heavy machinery, and in marine installations or the like.

It is to be understood that in the constructions herein disclosed, the driving flange may be connected to the housings carrying the bushings 10 or it may be connected to the core portions of the resilient bushings 10 as may be desired. Hence the reference to driving and driven members in this specification are solely for the purpose of describing the particular construction herein disclosed and are not to be considered as limiting the invention or of requiring any particular relationship between the connections of the pockets and the cores of the resilient bushings 10.

It will be observed in all of the embodiments of the invention herein disclosed, that a rigid member is utilized to locate the centers of the resilient members 10 in the assembly and to assure the distribution of the loads over all of the resilient bushings in the assembly.

I claim:

1. A resilient torque transmitting coupling including a plurality of resilient bushings each having a central core portion and a circumferential shell, a pocket surrounding the shell of each of said bushings and having a connector flange in the shape of a truncated radial segment detachably secured to a rotatable flange, and a rigid connector plate member secured to the central core portions of all of said resilient bushings.

2. A resilient torque transmitting coupling including a plurality of resilient bushings, each having a central core portion and a circumferential shell, a pocket surrounding the shell of each of said bushings and having a connector flange in the shape of a truncated radial segment detachably secured to the flanges connected to the driving and driven members respectively, and a rigid connector plate disposed between said flanges and connected with the core portions of all of said plurality of resilient bushings.

3. A resilient torque transmitting coupling including a plurality of resilient bushings each having a central core portion and a circumferential shell, a pocket surrounding the shell of each of said bushings and having a connector flange in the shape of a truncated radial segment detachably secured to a rotatable flange, a rigid connector member secured to the central core portions of all of said resilient bushings, locating means on said rigid connector member and attaching means secured to the cores of said resilient bushings and cooperating with said locating means to connect the core portions of said resilient bushings to said rigid connector member in preselected and fixed locations.

4. A resilient torque transmitting coupling including a plurality of resilient bushings, each having a central core portion and a circumferential shell, a pocket surrounding the shell of each of said bushings and having a connector flange in the shape of a truncated radial segment detachably secured to the flanges connected to the driving and driven members respectively, a rigid connector plate disposed between said flanges and connected with the core portions of all of said plurality of resilient bushings, locating means on said rigid connector plate and attaching means secured to the cores of said resilient bushings and cooperating with said locating means to connect the core portions of all of said resilient bushings to said connector member in preselected and fixed locations.

5. A device as claimed in claim 2 and further characterized in that a recess in the shape of the connector flange is provided on one face of the rotatable flange to locate and hold said connector flanges in position.

6. A device as claimed in claim 4 and further characterized in that recesses in the shape of the connector flange are provided on the faces of the driving and driven member flanges to locate and hold said connector flanges in position.

7. A resilient torque transmitting coupling including a rotatable driving member having a shoulder thereon, a rotatable driven member having a shoulder thereon, the driving and driven members being rotatable about a common axis, a plurality of resilient bushings circumferentially disposed on said driving member shoulder and driven member shoulder about the common axis of rotation and extending parallel thereto, each of said bushings having a central core portion and a circumferential shell, a pocket surrounding the shell of each of said bushings and having a connector flange detachably secured to one of the driving and driven member shoulders, a rigid connector plate disposed between said driving and driven member shoulders and connected with the core portions of all of said plurality of resilient bushings.

8. A resilient torque transmitting coupling as claimed in claim 7 and further characterized in that said resilient bushings are aligned in pairs extending parallel to the common axis of rotation, one of each pair being affixed to the driving member shoulder and one of each pair being affixed to the driven member shoulder, a single connecting member affixing each pair of aligned bushings to the connector plate.

FREDERICK M. GUY.

REFERENCES CITED

The following references are of record in the file of this patent:

UNITED STATES PATENTS

| Number | Name | Date |
| --- | --- | --- |
| 1,978,939 | Guy | Oct. 30, 1934 |
| 2,181,183 | Guy | Nov. 28, 1939 |
| 2,195,647 | Guy | Apr. 2, 1940 |
| 2,396,353 | Venditty | Mar. 12, 1946 |
| 2,477,447 | Fawick | July 26, 1949 |
| 2,482,488 | Julien | Sept. 20, 1949 |

FOREIGN PATENTS

| Number | Country | Date |
| --- | --- | --- |
| 474,581 | Great Britain | 1937 |